Jan. 11, 1927.
W. F. KASPER
1,613,835
TWO-PIECE CRANK SHAFT
Filed July 8, 1925
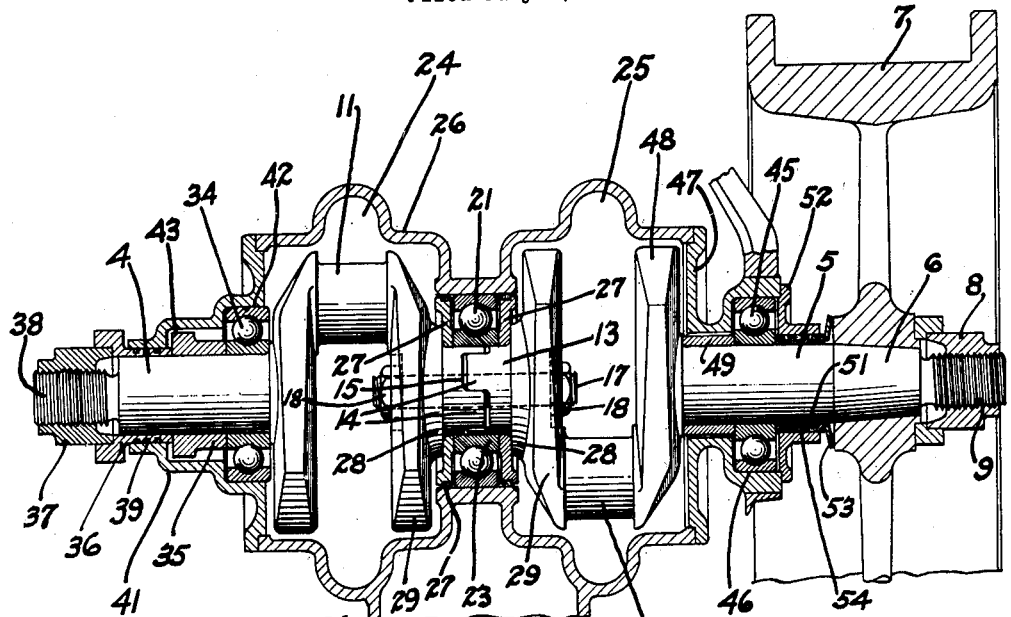
FIG.1
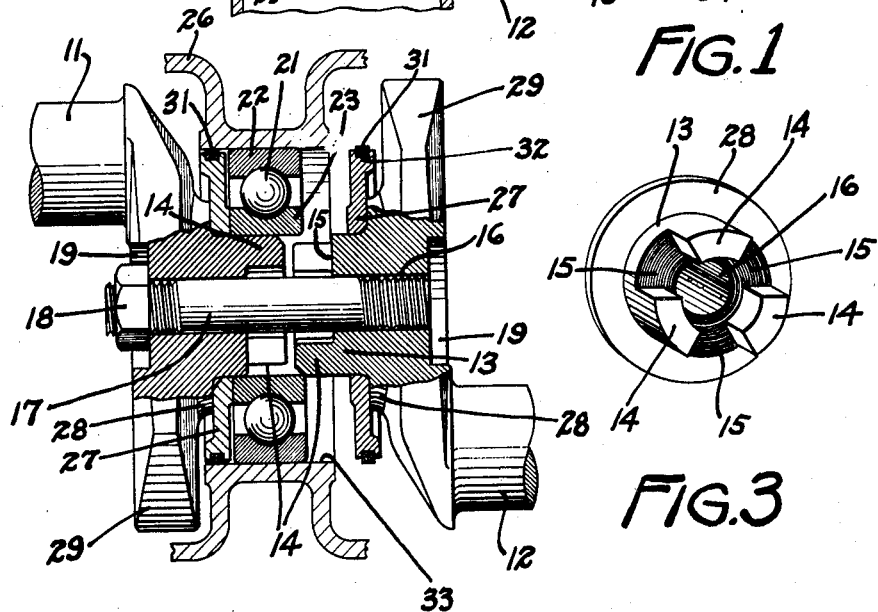
FIG.2
FIG.3
Inventor
WALTER F. KASPER
By Paul, Paul & Moore
ATTORNEYS Patented Jan. 11, 1927.

1,613,835

UNITED STATES PATENT OFFICE.

WALTER F. KASPER, OF FAIRMONT, MINNESOTA, ASSIGNOR TO FAIRMONT RAILWAY MOTORS, INC., OF FAIRMONT, MINNESOTA, A CORPORATION OF MINNESOTA.

TWO-PIECE CRANK SHAFT.

Application filed July 8, 1925. Serial No. 42,223.

This invention relates to improvements in crank shafts and more particularly to a crank shaft comprising two or more cranks having a coupling means between said cranks for securely coupling them together for operation as a unit.

A further object of the invention is to provide a two-piece crank shaft having the coupling means therefor arranged between the two cranks thereof and such coupling being adapted to receive an annular bearing member for retaining the two sections of the crank shaft in true alignment with each other.

A further object is to provide a crank shaft comprising two sections and each section having a series of interlocking teeth adapted to interlock with similar teeth on the other section, thereby to prevent relative rotation of the two sections when coupled together, a suitable stud being centrally mounted in the coupled portion of the crank shaft to securely lock the two sections together.

A further object is to provide a two-piece crank shaft adapted to have an annular non-split bearing mounted thereon and also having a suitable packing arranged on each side of the bearing to provide leakage from one crank chamber to the other.

The particular object therefore of the invention is to provide an improved two-piece crank shaft particularly adapted for use in connection with internal combustion engines of the two-cycle type, means being provided between the cranks thereof for preventing the leakage of gas from one crank chamber to the other when the engine is in operation.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the accompanying drawings forming part of this specification,

Figure 1 is a longitudinal sectional view through my improved crank shaft showing the packing means provided in conjunction with each bearing for preventing leakage of oil or gas from the crank chambers;

Figure 2 is an enlarged detail sectional view showing the coupling members provided on each section of the crank shaft for coupling the two sections together; and Figure 3 is a perspective view showing the coupling member of one of the crank shaft sections.

The novel crank shaft features in this invention preferably comprises the alined end-sections 4 and 5, the latter preferably having a tapered portion 6 adapted to receive the usual combination flywheel and pulley 7, as shown in Figure 1. This flywheel may be secured to the shaft by means of the nut 8 received in threaded engagement with the threaded extension 9 of the shaft.

This novel crank shaft is particularly designed for use in connection with two-cylinder, two-cycle internal combustion engines, such as are frequently used on small cars of the railway motor type. Such crank shafts comprising two or more cranks are usually provided with bearings between the cranks in order to suitably support the crank shaft when in operation. On small crank shafts, it is desirable that such bearings be of the anti-friction type for the purpose of reducing, to a minimum, the usual friction in the bearings. It is, therefore, necessary that the crank shaft be constructed of two or more pieces in order that the bearing, which may be of the ball or roller type, may be mounted between the cranks thereof in assembling the crank shaft as such bearings cannot practically be made split or in two halves for mounting upon a finished crank shaft.

As shown in Figures 1 and 2, the crank shaft here featured comprises the cranks 11 and 12. Each section of the crank shaft is provided with a suitable coupling member 13 having a series of interlocking teeth 14 adapted to be received in correspondingly shaped recesses 15 provided in each coupling member, (see Figure 3). These locking teeth and recesses of each coupling member 13 are so arranged that when the two sections of the crank shaft are coupled together, the cranks 11 and 12 will be arranged diametrically opposite each other as shown. Each coupling member 13 is provided with a central aperture 16 adapted to receive a suitable threaded stud or tie-bolt 17 having nuts 18 terminally mounted thereon whereby the two sections of the crank shaft may be securely tied together for operation as a unit. (See Figure 1.) The opposite faces of the coupling members 13 are preferably provided with counter-bores 19 adapted to receive the nuts 18.

In assembling the two sections of the crank shaft, a suitable anti-friction bearing 21 is mounted to encircle the coupling members 13. The bearing shown in the drawings is of the usual ball type comprising a plurality of balls mounted between the inner and outer ball races 22 and 23. The diameter of the coupling members 13 are machined so as to provide a press fit in the inner ball race 23 so that when mounted therein, said ball race will provide a means for retaining the two coupling members in true axial alignment with each other.

Means are also provided in conjunction with this central bearing 21 for providing a gas-tight joint between the two crank chambers 24 and 25 as it is to be understood that the outer ball race 22 is not tightly fitted into the bore of the crank-case 26, as its diameter must be such as to provide sufficient clearance therein to permit the outer ball race to adjust itself in alignment with the inner ball race when in operation. The ball race 22 will therefore not provide a leak-tight joint between the two crank chambers and it is therefore necessary that other means be provided for preventing such leakage. The means provided for preventing such leakage of oil or gas between the two crank chambers preferably consists of a pair of peripherally grooved discs 27 mounted upon the coupling members 13 between the hubs 28 provided on the adjacent cheeks 29 of each crank shaft section and the opposed sides of the ball bearing 21. A suitable packing 31 is mounted in the peripheral groove 32 of each disc 27. This packing is adapted to engage the bore 33 of the crank case 26 when the shaft is assembled therein, thereby to positively prevent any leakage of gas or oil from one crank chamber to the other.

In assembling the two sections of the crank shaft, one of the discs 27 will first be mounted upon one of the coupling members 13 as shown in Figure 2, after which the ball bearing 21 will be pressed onto said coupling member until the disc 27 will be securely clamped between the hub 28 and the inner ball race 23. The other disc 27 will then be mounted upon the coupling member of the other crank section after which this latter coupling member will be inserted into the inner race of the bearing and securely pressed thereinto to the position shown in Figure 1, it being understood of course that the interlocking teeth 14 are properly aligned with the recesses 15. After the two crank sections have thus been securely pressed into the inner ball race of the bearing, the tie-bolt 17 is inserted in the apertures 16 and the nuts 18 mounted thereon, thereby securely clamping the two crank sections against the discs 27 and the inner ball race positioned therebetween. By this novel method of assembling the crank shaft, it will be substantially as rigid and secure as if constructed or forged from one piece of metal as is customary in the construction of ordinary crank shafts.

The outer bearings of the crank shaft are also preferably provided with a suitable packing means for preventing the leakage of oil or gas therethrough. As shown in Figure 1, a bearing 34 is mounted on the end-portion 4 of the crank shaft. A spacing collar 35 is also mounted on the end portion 4 having one end adapted to engage the inner ball race of the bearing 34 and its outer end or face adapted to be engaged by a grooved packing gland or sleeve 36 which is securely clamped or forced thereagainst by means of a locknut 37 terminally mounted on the threaded end-portion 38 of the crank shaft. A series of annular grooves 39, having a suitable packing therein, are peripherally provided in the packing sleeve 36. This packing functions to prevent any leakage of oil or gas through the end cap 41 mounted on the crankcase 26. The end cap 41 also has a seat 42 provided therein to receive the outer ball race of the bearing 34 as shown. It will also be noted that the spacing collar 35 is provided with a peripheral flange 43 which functions as an oil slinger to throw off any oil which may creep along the collar and thereby tend to prevent such oil from coming in direct contact with the packing sleeve 36. Thus it will readily be seen that by the provision of the packing sleeve 36 in conjunction with the bearing 34, it will be practically impossible for any oil or gas to escape therethrough from the crank chamber 24.

The opposite end of the crank shaft is supported by means of a similar bearing 45 seated in a bore 46 provided in the end cap 47 of the crankcase. In the construction here shown, the bearing 45 is preferably spaced from the adjacent cheek 48 of the crank shaft and a spacing collar 49 is therefore mounted upon the end-portion 5 of the crank shaft adapted to engage the cheek 48 and the adjacent side of the inner ball race of the bearing 45 for the purpose of retaining the bearing 45 in its proper position upon the crank shaft. A packing sleeve 51 is also mounted on the end-portions 5 of the chank shaft and has one end engaging the inner ball race of the bearing 45. This sleeve is preferably mounted in a relatively smaller cap 52 secured to the end cap 47. A tension ring or disc 53 is interposed between the outer end of the packing sleeve 51 and the inner face of the flywheel hub thereby to retain the latter in its proper position against the bearing 45. This packing sleeve is similarly provided with a series of grooves in which a suitable packing 54 is mounted, which packing cooperates with the bore of the cap 52 to prevent any leakage of oil or gas therethrough.

From the foregoing, therefore, it will readily be seen and understood that this novel two-piece crank shaft is well adapted for use in conjunction with an internal combustion engine of the two-cycle type. By means of the novel arrangement of the packing provided in combination with each bearing, it will practically be impossible for any leakage of oil or gas through the bearings. In assembling or mounting the crank shaft in the crankcase, of the engine, it is to be understood that the crankcase is preferably split or made in two halves in order that the center bearing may be received therebetween.

Having thus described my invention, what I claim as new and desire to secure by Letters Patent is,

1. The combination with a crank shaft comprising a plurality of sections having cylindrical end portions adapted to be secured together, an annular bearing mounted upon said end portions and disks also mounted upon said end portions rotatable with the shaft, each disk being peripherally grooved and having a packing ring set within and projecting from the groove, and adapted to prevent leakage through the bearing.

2. The combination with a crank shaft comprising a plurality of sections having cylindrical end portions adapted to be secured together, an annular bearing mounted upon said end portions and means also mounted upon said end portions adapted to prevent leakage through said bearing, said means comprising peripherally grooved discs and a packing therefor arranged on each side of said bearing.

3. A two-piece crank shaft for a two-cycle internal combustion engine, cylindrical end portions adapted for interlocking engagement with each other provided on each crank section, an annular bearing member mounted upon said end portions and functioning to axially aline them, a supporting means for said bearing, and disks also mounted upon said end portions clampingly held between one of the elements of the annular bearing member and shaft sections, and adapted to cooperate with said supporting means to prevent leakage through the bearing.

4. A two-piece crank shaft for a two-cycle internal combustion engine, a cylindrical end portion provided on each crank section having interlocking teeth provided thereon adapted to intermesh with similar teeth upon the cylindrical end portion of the other crank section, a threaded stud for securing together the two sections, an annular anti-friction bearing mounted upon said end portions, a supporting means for the bearing, peripherally grooved discs mounted upon said end portions adjacent each side of the bearing, and a packing seated in the grooves of said discs adapted to engage said supporting means whereby leakage through said bearing will be prevented.

5. A crank shaft comprising two sections, cylindrical end portions on said crank sections adapted for interlocking engagement, an annular bearing mounted upon said shaft between the cranks thereof and on each side of said cranks, supporting means for said bearings, and disks also mounted upon said crank shaft rotatable therewith, each disk having a packing ring set in its periphery, and functioning to prevent leakage through the bearing.

6. A device of the class described, including a partition wall having a bearing opening therein, two crank sections having reduced terminal portions interlockingly engaged and traversing the bearing opening, an annular bearing having one element mounted upon said interlockingly engaged portions, and having the other element engaging the bearing bore, disks engaged against the first mentioned bearing element from opposite sides, each disk having a packing engaging the bearing bore, and a bolt passing axially through the reduced crank portions, and clampingly securing the disks against the inner bearing element, said disks being spaced from the outer bearing element.

In witness whereof, I have hereunto set my hand this 3rd day of July 1925.

WALTER F. KASPER.